US012571375B2

(12) United States Patent       (10) Patent No.:    US 12,571,375 B2

Pascual Resano et al.            (45) Date of Patent:     Mar. 10, 2026

(54) WIND TURBINE

(71) Applicant: Nordex Energy Spain, S.A., Barasoain (ES)

(72) Inventors: Javier Pascual Resano, Barasoain (ES); Jose Luis Aristegui Lantero, Barasoain (ES); Teresa Arlaban Gabeiras, Barasoain (ES); Jose Miguel Garcia Sayes, Barasoain (ES); Miguel Nunez Polo, Barasoain (ES)

(73) Assignee: Nordex Energy Spain, S.A., Barasoain (ES)

( * ) Notice: Subject to any disclaimer, the term of this patent is extended or adjusted under 35 U.S.C. 154(b) by 0 days.

(21) Appl. No.: 18/668,975

(22) Filed: May 20, 2024

(65) Prior Publication Data

US 2024/0309855 A1     Sep. 19, 2024

Related U.S. Application Data

(63) Continuation of application No. 17/968,361, filed on Oct. 18, 2022, now Pat. No. 12,180,942, which is a (Continued)

(30) Foreign Application Priority Data

Nov. 4, 2016    (EP) ..................................... 16382508

(51) Int. Cl.
| | |
|---|---|
| *F03D 80/70* | (2016.01) |
| *F03D 1/06* | (2006.01) |
| *F03D 7/02* | (2006.01) |
| *F16C 33/58* | (2006.01) |
| *F16C 19/18* | (2006.01) |

(52) U.S. Cl.
CPC ........... *F03D 80/70* (2016.05); *F03D 1/0658* (2013.01); *F03D 1/0691* (2013.01); *F03D 7/0224* (2013.01); *F16C 33/586* (2013.01); *F05B 2240/50* (2013.01); *F05B 2240/54* (2013.01); *F05B 2260/79* (2013.01); (Continued)

(58) Field of Classification Search
None
See application file for complete search history.

(56) References Cited

U.S. PATENT DOCUMENTS 8,322,928 B2 * 12/2012 Larsen .................... F16C 33/60
                                           384/129
9,759,197 B2     9/2017 Pasquet
(Continued)

FOREIGN PATENT DOCUMENTS

| | | |
|---|---|---|
| EP | 2045464 A2 | 4/2009 |
| EP | 2985458 A1 | 2/2016 |
| WO | 2007003866 A1 | 1/2007 |

*Primary Examiner* — Sabbir Hasan
(74) *Attorney, Agent, or Firm* — Hayes Soloway PC

(57) ABSTRACT

The present invention describes a wind turbine comprising a hub, at least one blade and at least one pitch bearing to connect the at least one blade to the hub, the at least one pitch bearing comprising at least an inner ring and an outer ring, and at least a rolling race, wherein the wind turbine further comprises at least a tensioning system configured to exert a radial compression force to at least a part of the outer ring of the at least one pitch bearing, thus increasing the resultant stiffness of the at least one pitch bearing.

9 Claims, 7 Drawing Sheets

Related U.S. Application Data continuation of application No. 15/803,029, filed on Nov. 3, 2017, now Pat. No. 11,506,184.

(52) U.S. Cl.
CPC ........ *F16C 19/181* (2013.01); *F16C 2300/14* (2013.01); *F16C 2360/31* (2013.01); *Y02E 10/72* (2013.01)

(56) References Cited

U.S. PATENT DOCUMENTS

| | | | |
|---|---|---|---|
| 2011/0014047 A1 | 1/2011 | Mascioni et al. | |
| 2015/0086359 A1* | 3/2015 | Jacobsen ............... | F03D 1/0633 |
| | | | 416/174 |
| 2018/0003239 A1 | 1/2018 | Mcnichols et al. | |
| 2018/0258997 A1* | 9/2018 | McNichols ............. | F16C 33/58 |

* cited by examiner

WIND TURBINE

CROSS-REFERENCE TO RELATED APPLICATION AND PRIORITY

This patent application is a Continuation of U.S. patent application Ser. No. 17/968,361 filed on Oct. 18, 2022, which is a Continuation of U.S. patent application Ser. No. 15/803,029 filed on Nov. 3, 2017 (U.S. Pat. No. 11,506,184 issued Nov. 22, 2022), which claims priority from European Patent Application No. 16382508.6 filed on Nov. 4, 2016, each of which are herein incorporated by reference in their entirety.

OBJECT OF THE INVENTION

The present invention is enclosed in the technical field of wind turbines. It is disclosed a wind turbine comprising a tensioning system that allows increasing the stiffness of a bearing connecting a blade and a hub of the wind turbine.

BACKGROUND OF THE INVENTION

A wind turbine generally comprises a tower and a nacelle positioned on top of the tower. A wind turbine rotor comprising usually three blades is connected to the nacelle through a shaft which is connected to a generator with or without a gearbox.

Modern wind turbines are provided with a pitch control system to control the load on the rotor which is configured to pitch the blades in and out of the wind in order to modulate the energy capture as wind decreases or increases. The blades are pitched to optimize the output or to protect the wind turbine from damaging overloads.

To perform the pitch control each blade is provided with a pitch bearing located generally between the hub and the blade, and a mechanism, usually a hydraulic cylinder or an electric motor, to provide the necessary force for pitching the blade and maintaining it in a given position. This pitching arrangement enables each blade to be turned approximately 90° around their longitudinal axis. The pitch bearing is also in charge of transferring the loads from the blades to the hub.

In order to increase the energy captured from wind, longer blades and thus bigger rotors are used in modern wind turbines. This implies also that the wind load acting on the blades increases which can lead to higher deformation of both the blades and the hub. These facts make the pitch bearings becoming even more crucial for the correct behavior of the rotor as they have to be able to transfer loads induced to the blades by the wind load to the hub and at the same time enable an accurate and smooth rotation of the blades.

In pitch-controlled wind turbines these loads, which are not constant and de-pend on the pitch angle of the blade at each time, are transferred from the blades to the hub through the pitch bearing which becomes one of the most critical components of the wind turbine.

Therefore, the pitch bearings are subjected to extreme and fatigue loads from flap-wise and edgewise bending moment of the blades. Because of the stiffness difference between the blades and the hub along the perimeter of the blade root, those loads may lead to uneven deformations along the pitch bearing which may increase the stress concentration in several parts of it and cause premature failure.

To avoid these previous undesirable effects which reduce the life of the bearing and with the aim to maintain its functionality, several solutions have been used in the state of the art. The most straightforward solution being enlarging the pitch bearing in at least one of its dimensions: diameter, height or thickness, thereby increasing the bearing cost and weight significantly.

In such a solution, the design of the whole bearing is determined by the maximum stress that may only appear at a particular pitch angle position leading to an oversized solution for the rest of pitch angles.

Other solutions rely on adding reinforcing plates attached to at least one of the rings of the bearing to avoid increasing its size. In some cases, due to the dimension of the reinforcing plates its installation is complicated especially once the blades are attached to the hub.

Document WO2007003866 (A1) discloses a bearing to connect blades of a wind turbine to a hub and is located between at least a root of a wind turbine blade and at least one hub connection, comprising at least an inner ring, at least an outer ring and at least one reinforcement attached to one of the bearing rings.

Although in these solutions the use of material can be reduced with regards to the option comprising an increase of the bearings size, the solution requires machining of the reinforcing plates, which also increases the cost of the reinforcement solution.

DESCRIPTION OF THE INVENTION

The present invention describes a wind turbine comprising a hub, at least one blade and at least one pitch bearing to connect the at least one blade to the hub, the at least one pitch bearing comprising at least an inner ring and an outer ring, and at least a rolling race.

The wind turbine further comprises at least a tensioning system configured to exert a radial compression force to at least a part of the outer ring of the at least one pitch bearing.

That tensioning system allows increasing the resultant stiffness of the at least one pitch bearing in order to reduce the difference in stress level along the bearing. It is frequent to have higher stresses in specific parts of the bearing rings than in other parts during the operation of the wind turbine. Sometimes, there are specific points in the bearing rings where stress concentrations can be found that may cause the bearing failure. These stress concentrations can be caused by:

- high roughness of the bolt holes (the bolts are used for joining the bearings to the root of the blade and to the hub);
- local defects caused during manufacture;
- weak sections of the bearings (generally the areas in which the bearing rolling elements are introduced);
- high corrosion in the bolt holes;
- critical sections due to increased loads in particular wind turbine locations.

The at least a tensioning system of the wind turbine of the invention acts as a pitch bearing reinforcement that solves the aforementioned problems strengthening the most loaded areas of the at least one pitch bearing while ensuring a smooth stiffness transition of the set formed by the at least one pitch bearing and the tensioning system.

DESCRIPTION OF THE DRAWINGS

To complement the description being made and in order to aid towards a better understanding of the characteristics of the invention, in accordance with a preferred example of practical embodiment thereof, a set of drawings is attached

Figures 1, 2, 3:
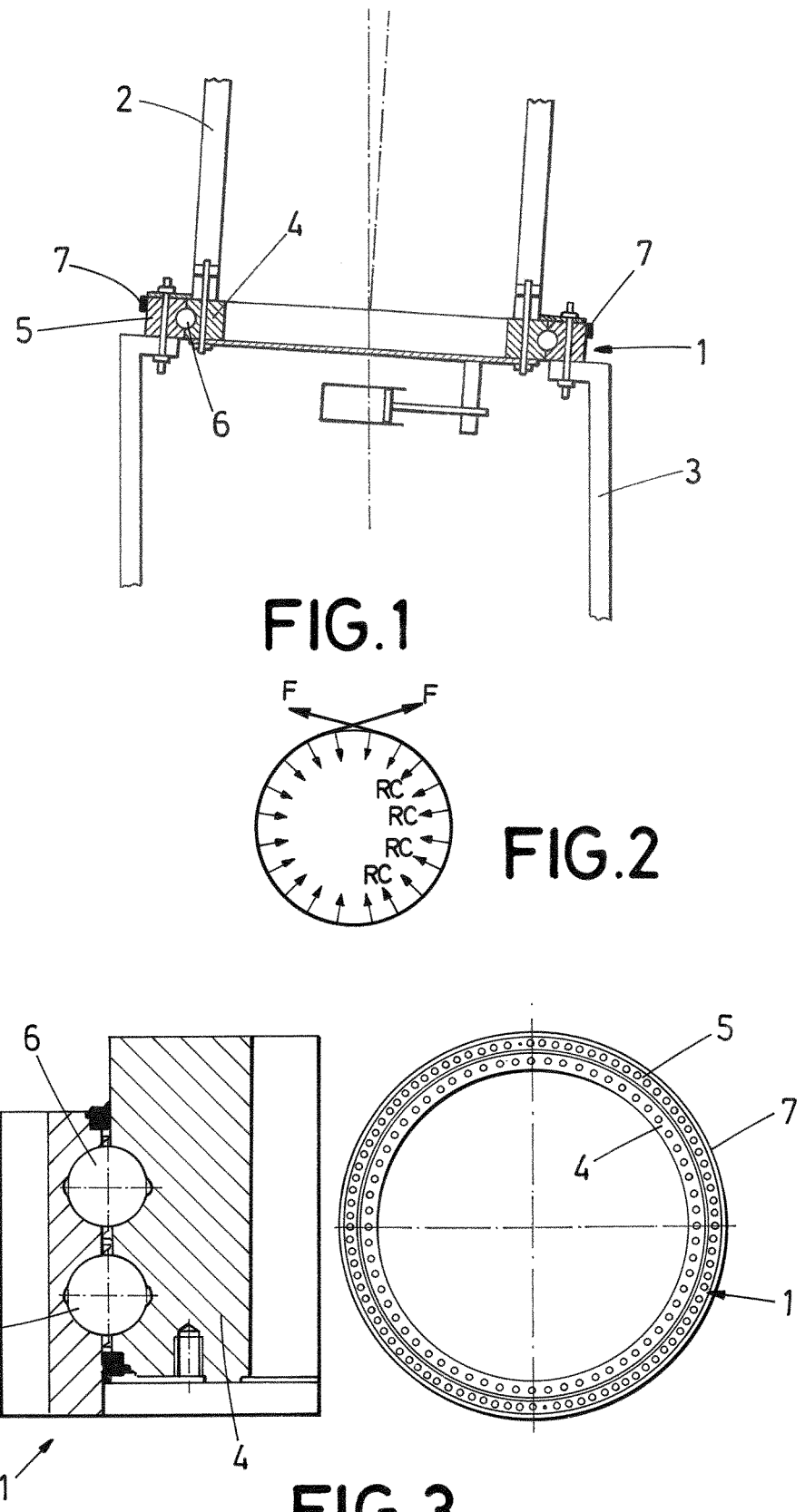

3 as an integral part of said description wherein, with illustrative and non-limiting character, the following has been represented:

FIG. 1 shows the position of the tensioning system in the wind turbine of the invention.

FIG. 2 shows the force exerted to the ring of the bearing by a tensioning element of the tensioning system of the wind turbine.

Figure 4:
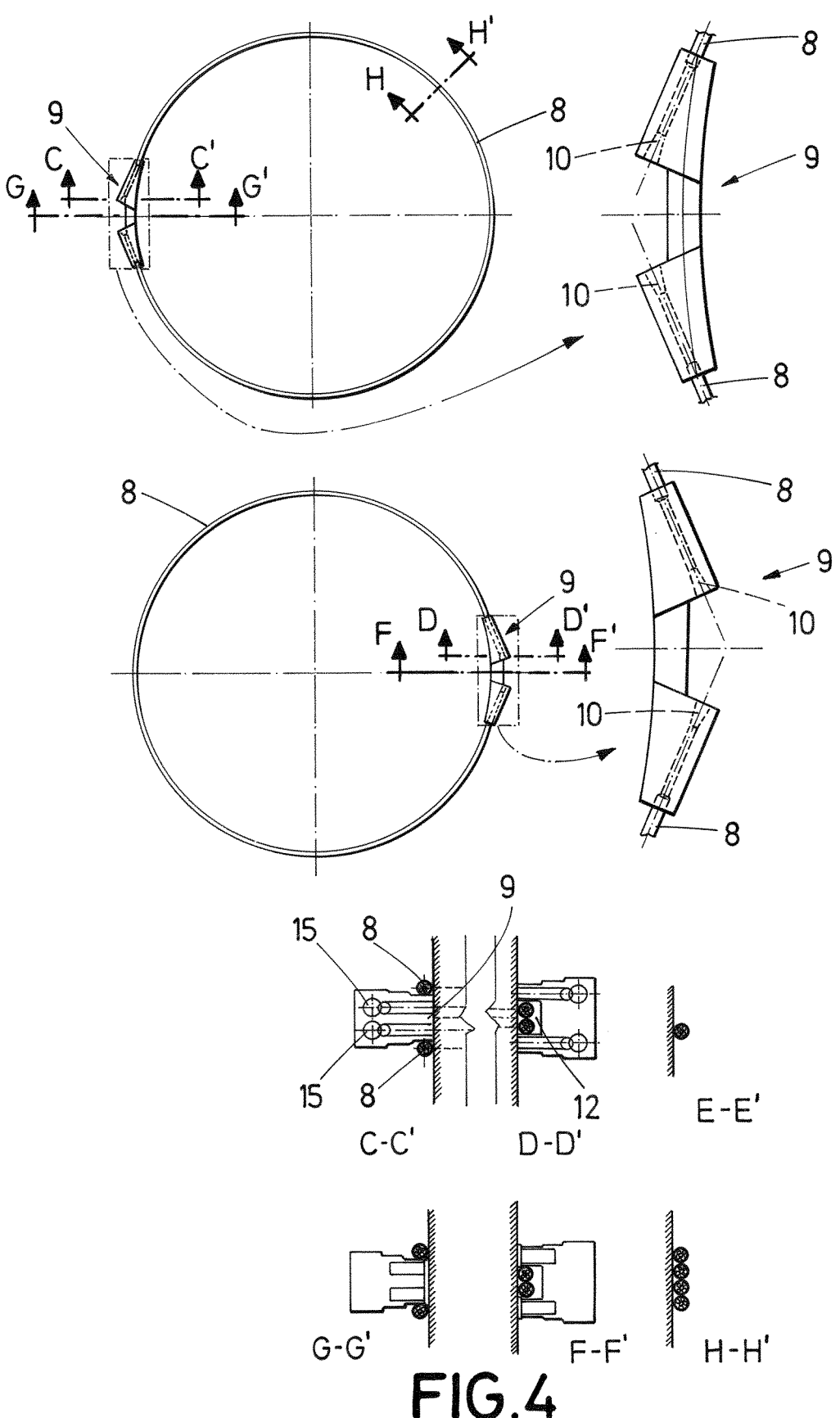

FIG. 3 shows the position of the tensioning system on the bearing were a cross-section and front view are appreciated FIG. 4 shows an embodiment in which there is only one anchoring element of the tensioning system and shows also different sections of the tensioning and anchoring elements.

Figure 5:
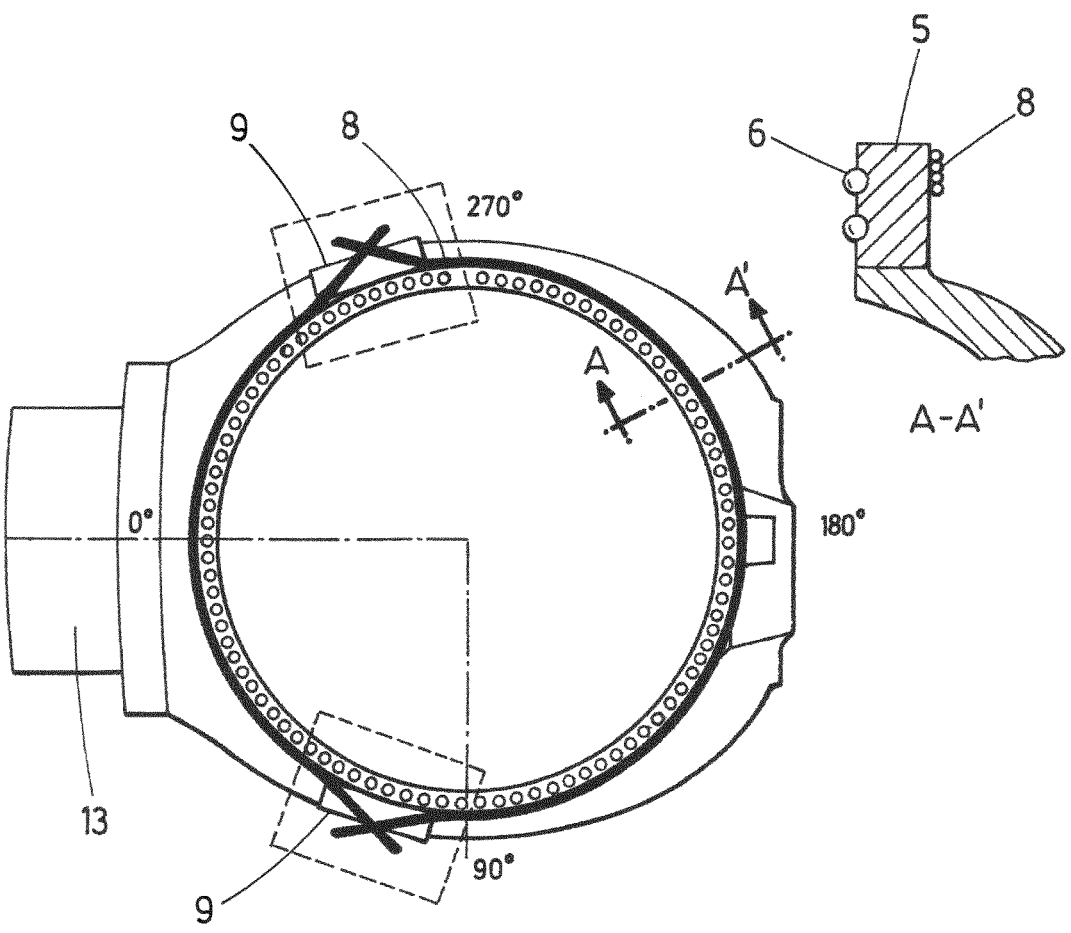

FIG. 5 shows an embodiment of the tensioning system comprising four tensioning elements, the tensioning elements being strands and two anchoring elements; a section of the tensioning system is also shown.

Figure 6:
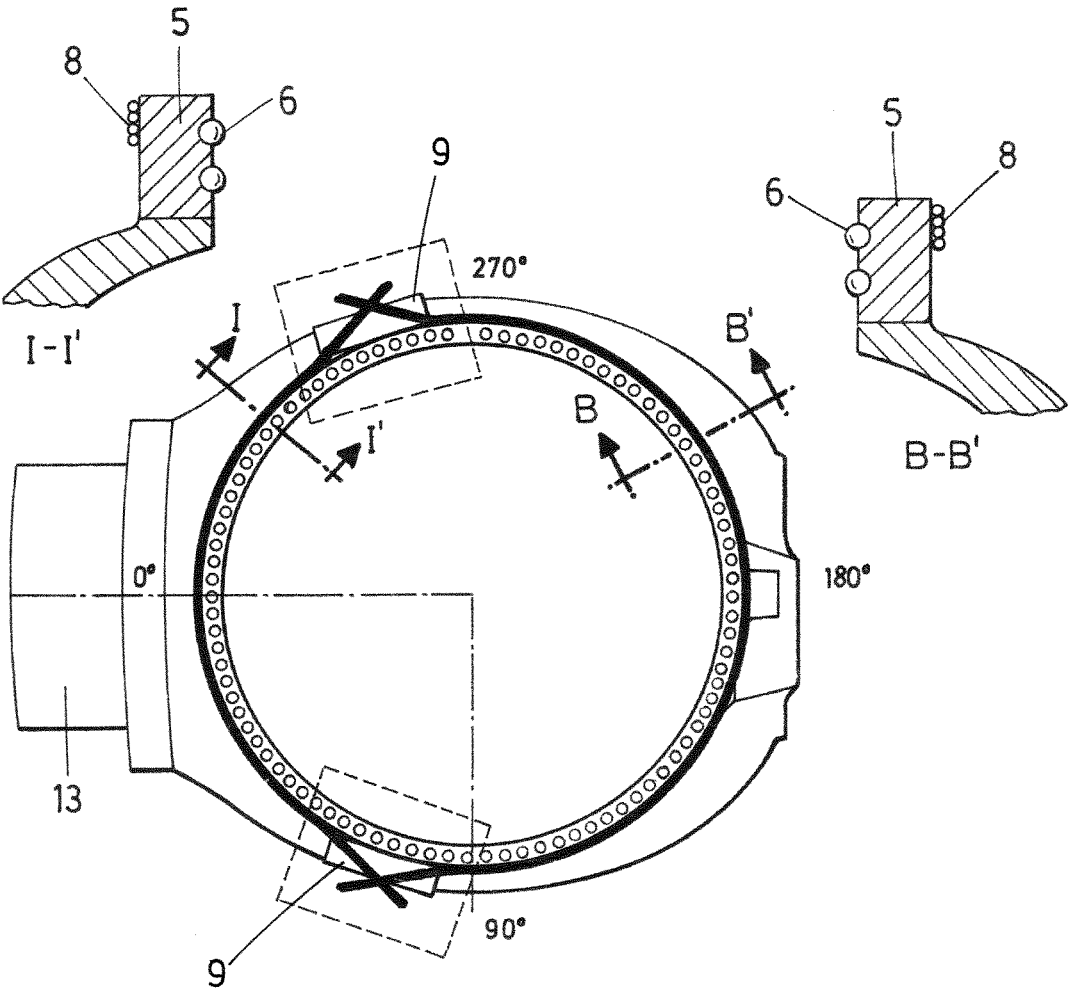

FIG. 6 shows an embodiment of the tensioning system comprising eight tensioning elements, the tensioning elements being strands and two anchoring elements.

Figure 7:
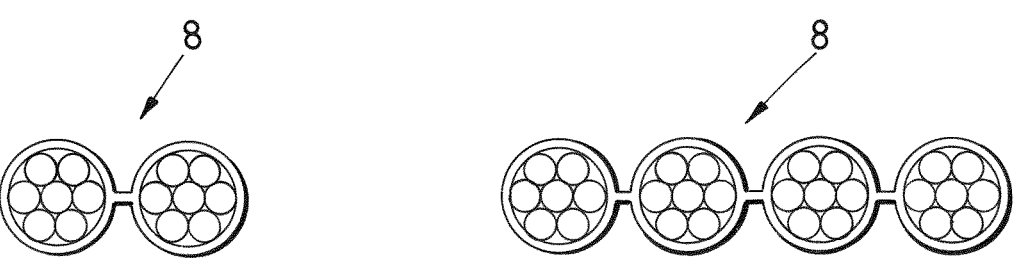

FIG. 7 shows two embodiments of the tensioning system with two and four tensioning elements, the tensioning elements being strands, disposed in parallel.

Figure 8:
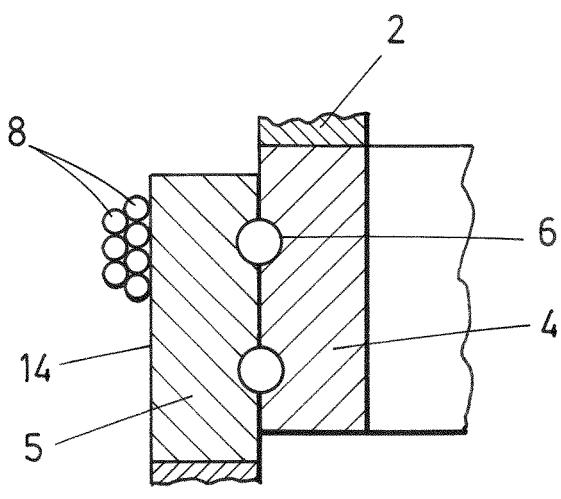

FIG. 8 shows a plurality of tensioning elements stacked together to work in a specific zone of the bearing.

Figure 9:
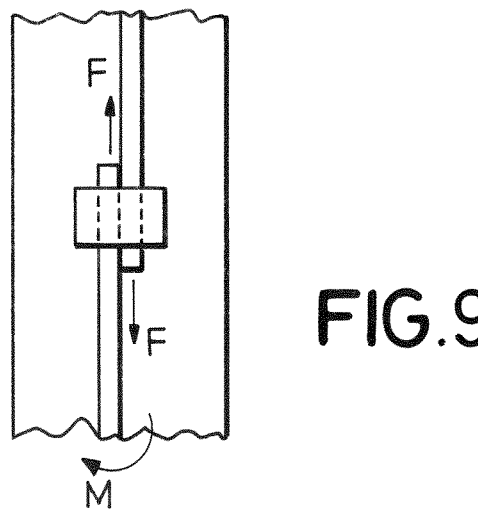

FIG. 9 shows the torque in the ring of the bearing when the longitudinal axis of the tensioning element is not always contained within the same transversal plane to the axis of the bearing.

Figure 10:
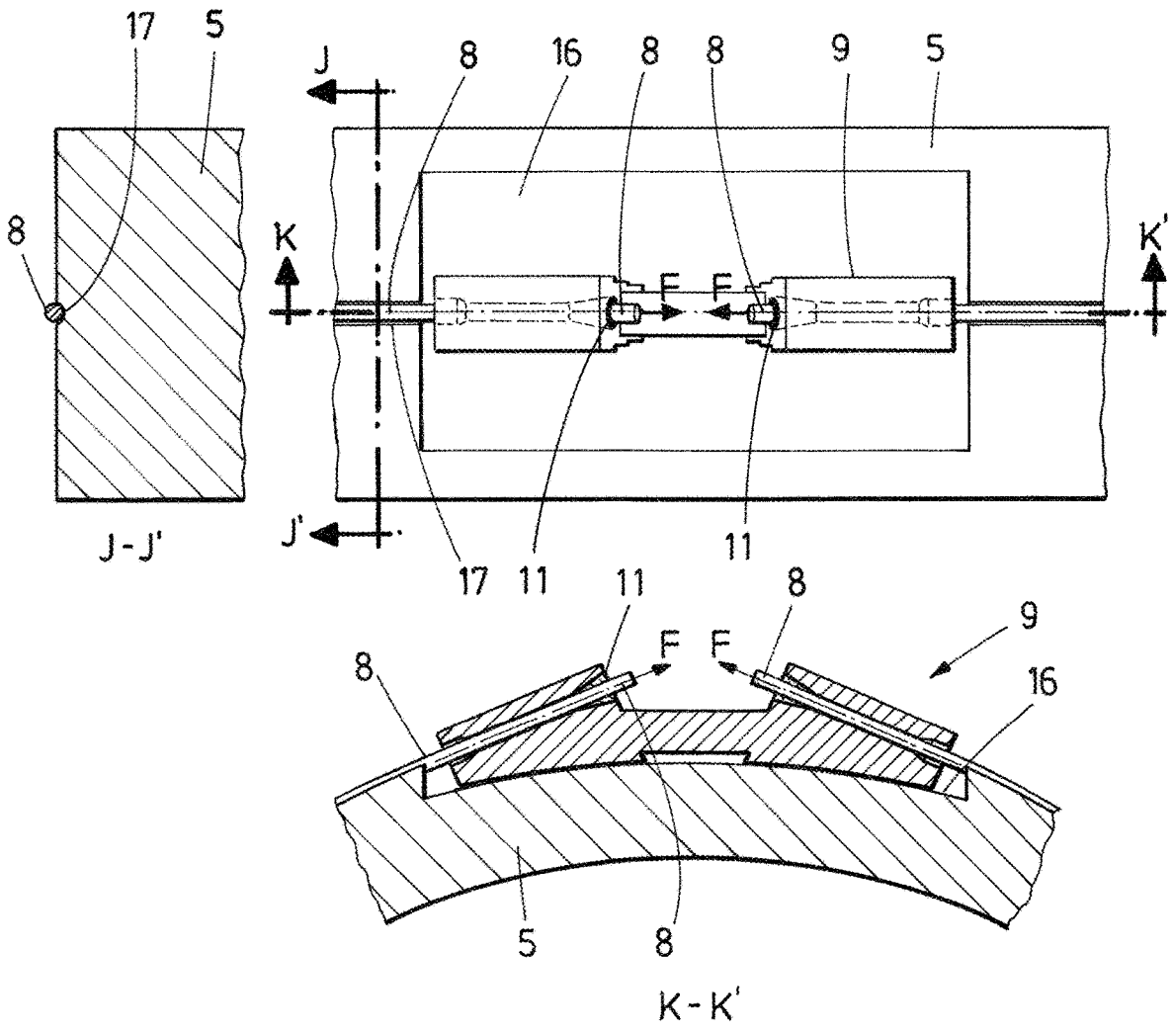

FIG. 10 shows an embodiment comprising a floating anchoring element with a countersunk to place the anchoring element and the outer ring of the bearing comprising a groove on the outer surface in which the tensioning elements are located.

Figures 11, 12, 13:
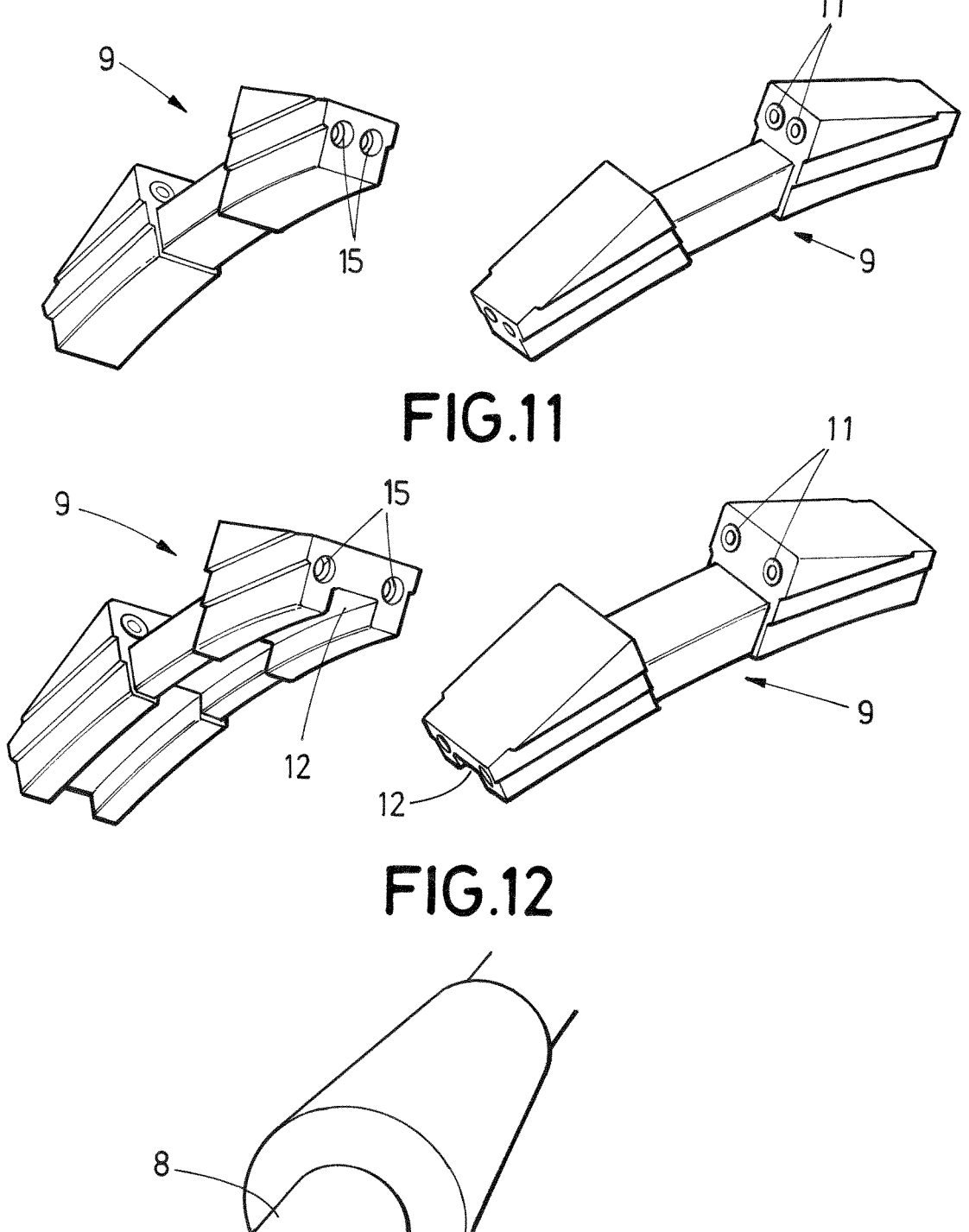

FIG. 11 shows an embodiment of an anchoring element.

FIG. 12 shows another embodiment of an anchoring element in which there is a groove for receiving the tensioning elements that are not anchored to this anchoring element.

FIG. 13 shows a fixing element configured to fix the at least one of the two ends of the tensioning element to the at least one anchoring element.

PREFERRED EMBODIMENT OF THE INVENTION

The wind turbine of the present invention comprises at least a hub (3), at least one blade (2) and at least one pitch bearing (1) to connect the at least one blade (2) to the hub (3). The at least one pitch bearing (1) comprises at least an inner ring (4), an outer ring (5) and at least a rolling race (6).

The essential feature of the wind turbine of the invention is that it comprises at least a tensioning system (7) configured to exert a radial compression force to at least a part of the outer ring (5) of the at least one pitch bearing (1).

In FIG. 1, the tensioning system (7) of the wind turbine of the present invention is represented. As it can be seen, the tensioning system (7) is placed, in this case, around the outer ring (5) of the at least one pitch bearing (1).

FIG. 2 schematically represents the effect of a tensioning force (F) applied to a tensioning system (7) that is seen as a radial compression force (RC) applied to the outer ring (5) of the at least one pitch bearing (1). In such an embodiment, the tensioning system (7) applies the force to the whole external perimeter of the outer ring (5) of the at least one pitch bearing (1).

4

The tensioning system (7) comprises:
at least one tensioning element (8) with two ends (10);
at least one anchoring element (9) configured to receive at least one of the two ends (10) of said tensioning element (8); and
at least one fixing element (11) configured to fix the at least one of the two ends (10) of the tensioning element (8) to the at least one anchoring element (9).

The fixing element (11) cooperates with the anchoring element (9) to fix the position of the at least one of the two ends (10) of the tensioning element (8) with respect to the anchoring element (9). It allows standing the tensioning forces once applied.

Preferably, the tensioning system (7) comprises at least two tensioning elements (8) which are fixed each to a different anchoring element (9).

In an embodiment, the at least one anchoring element (9) comprises at least one hole (15) configured to allocate the at least one of the two ends (10) of the at least one tensioning element (8) such that the at least one tensioning element (8) has one of its two ends (10) passing through the at least one hole (15) and the at least one fixing element (11) is used to fix the tensioning element (8) to the anchoring element (9) once it is tensioned. Once the tensioning system (7) is fully assembled and a tension (F) is applied to the tensioning elements (8), a radial compression force (RC) is exerted to the outer ring of the at least one pitch bearing (1), which in turn confers a higher stiffness to the at least one pitch bearing (1) in the region where the tensioning element (8) is located. That force (F) affects the at least one pitch bearing (1) by radially compressing it, as shown in FIG. 2. This is particularly beneficial for reducing deformations of the at least one pitch bearing (1) that could result in increased fatigue damage during operation.

In another embodiment, the outer ring (5) of the at least one pitch bearing (1) comprises a flat surface proximate to the at least one blade (2) and a flat surface proximate to the hub (3), wherein the tensioning element (8) is located more proximate to the flat surface proximate to the at least one blade (2) than to the flat surface proximate to the hub (3).

This embodiment is particularly beneficial when the outer ring (5) of the at least one bearing (1) is joined to the hub (3), as in the area proximate to the hub (3) the resultant stiffness of the at least one bearing (1) is greater than in the area opposed to it (close to the flat surface more proximate to the at least one blade (2)) meaning that the bearing deformations in the area proximate to the hub (3) would be smaller than in the area opposed to it in a state-of-the-art wind turbine. With the use of a tensioning system (7) like the one of the present invention, the resultant stiffness is increased where deformations would have been greater, i.e. by means of locating the tensioning system (7) more proximate to the flat surface proximate to the at least one blade (2).

This is particularly beneficial in case of the at least one pitch bearing (1) comprising at least two rolling races (6), as represented in FIG. 3. In this case, the tensioning system (7) enables increasing the stiffness of the at least one pitch bearing (1) in the region where it needs it the most. As it has been explained, when the outer ring (5) is joined to the hub (3), the region of the at least one bearing (1) closer to the hub (3) is stiffer than the region closer to the at least one blade (2). This implies that, during operation, the loads transferred from the at least one blade (2) and the inner ring (4) through the rollers to the outer ring (5) entail a greater deformation in the region of the outer ring (5) closer to the at least one blade (2). The solution of the present invention enables a similar behavior of both rolling races (6), keeping the working angle of the rollers closer to the optimal angle (around 45°) in both rolling races (6).

In another embodiment, the tensioning element (8) is located more proximate to the flat surface proximate to the hub (3) than to the flat surface proximate to the at least one blade (2). This embodiment is preferred when the outer ring (5) of the at least one bearing (1) is joined to the at least one blade (2).

In an embodiment, the bearing comprises at least two rolling races (6) each one proximate to a flat surface of the outer ring (5) of the at least one pitch bearing (1) as explained above. In this case, the tensioning elements (8) are placed more proximate to the rolling race (6) which is proximate to the at least one blade (2) if the outer ring (5) is joined to the hub (3), or are placed more proximate to the rolling race (6) which is proximate to the hub (3) if the outer ring (5) is joined to the at least one blade (2). The reason for this is that the rolling elements of the rolling race work in an optimal contact point because the tensioning system (7) reduces the deformations in the area of the at least one pitch bearing (1) where the rolling elements are located.

The outer ring (5) of the at least one bearing (1) comprises first surface, which is substantially flat for the connection to the hub (3) or to the at least one blade (2), It further comprises a second surface opposite to the first surface and a lateral inner surface which comprises the rolling race (6) and a lateral outer surface which is opposite to the lateral inner surface and is the outer surface (14) of the at least one pitch bearing (1). In FIG. 3, an embodiment of the invention in which the tensioning system (7) is located around the outer surface (14) of the outer ring (5) of the at least one pitch bearing (1) is shown.

As can be seen also in FIG. 4, the tensioning system (7) can be at least partially disposed over the outer surface (14) of the at least one pitch bearing (1), for example, being the tensioning elements (8) at least partially disposed over its outer surface (14). In the sections shown in said FIG. 4, the position of the tensioning elements (8) with respect to the anchoring elements (9) can be appreciated.

In an embodiment, the at least one anchoring element (9) is located close to a region of the at least one pitch bearing (1) subjected to greater loading or requiring greater reinforcement in such a way that the tensioning element (8) is submitted in such a region to a greater tension which in turn implies a greater compression to the outer ring (5) (the tension along the tensioning element (8) is greater closer to its end (10) where the tension force (F) is applied, i.e. close to the at least one anchorage element (9), as due to losses the tension diminishes along it).

In FIGS. 5 and 6 a main shaft (13) for connecting the hub (3) to the drive train of the wind turbine has been represented. Preferably, in an embodiment of the invention, the tensioning system (7) comprises at least two anchoring elements (9).

In an embodiment the two anchoring elements (9) are placed closer to a connecting area of the main shaft (13) of the wind turbine than to the opposite side. In particular, the anchoring elements (9) are located at a perimetral position with regards to the outer ring (5) of the at least one pitch bearing (1) that forms an angle of up to 90° with the projection of the axis of the main shaft (13) of the wind turbine in a plane perpendicular to the axis of the at least one pitch bearing (1) (marked as the 0° reference in FIGS. 5 and 6. The connection to the main shaft (13) provides the hub (3) and the at least one pitch bearing (1) with a higher rigidity in the areas proximate to said joint thus requiring a lower tensioning force while a higher tensioning level is required in more distant zones.

In an embodiment of the invention, the anchoring element (9) is removably attached to the outer ring (5) of the at least one pitch bearing (1). In another embodiment of the invention, the anchoring element (9) is removably attached to the hub (3). Also, in other embodiments the anchoring element (9) can be a part of the hub (3).

In the embodiment in which the anchoring element (9) is removably attached to outer ring (5) of the at least one pitch bearing (1), the anchoring element (9) is a floating anchoring element (9) having a contact surface configured to match an outer surface (14) of the at least one pitch bearing (1) in such a way that the tensioning system (7) remains in a fixed position after applying a certain tension to the tensioning element (8). In this way, there is no need of any further attachment of the at least one anchoring element (9) to the at least one pitch bearing (1), being the resultant compression force and the friction between the tensioning system (7) and the outer surface (14) of the outer ring (5) of the at least one bearing (1) the forces responsible for keeping the system in the adequate position. The tensioning force (F) applied to the tensioning element (8) translates into a radial compression (RC) force that affects the whole tensioning system (7) (including the tensioning elements (8) as well as the floating anchoring elements (9)) towards the at least one pitch bearing (1).

In this embodiment in which the anchoring elements (9) are floating anchoring elements (9), the tension along the whole perimeter of the at least one pitch bearing (1) is approximately homogeneous and evenly distributed. Using a floating anchoring element (9) may involve performing a countersunk to house, at least partially, the anchoring element (9).

In an embodiment, the at least one tensioning element (8) comprises at least one strand (i.e. a tendon or a cable), having preferably the at least one strand two ends (10) attached to the at least one anchoring element (9).

The tensioning system (7) is configured such as to maintain a longitudinal axis of the at least one tensioning element (8) in the same transversal plane to the axis of the at least one pitch bearing (1) along the whole length of the at least one tensioning element (8).

For such a purpose the geometry of the at least one anchoring element (9) is configured to keep the longitudinal axis of the at least one tensioning element (8) in the same transversal plane to the axis of the at least one pitch bearing (1) along the whole length of the at least one tensioning element (8). This technical feature implies, in an embodiment in which a tensioning element (8) has both ends (10) joined to a single anchoring element (9), that the anchoring element (9) comprises at least two holes (15) configured to allocate the two ends (10) of a tensioning element (8), wherein each one of the at least two holes (15) comprises an axis such that the axes of the at least two holes (15) are coplanar, preferably in at least some extension, being the longitudinal axis of both holes (15) comprised within the same transversal plane to the at least one pitch bearing (1) axis. This example can be seen for example in FIG. 4. On the other hand, in an embodiment in which the two ends (10) of the at least one tensioning element (8) are joined to two anchoring elements (9) respectively, as can be seen in the embodiments of FIGS. 5 and 6, this technical feature implies that each one of the two anchoring elements (9) comprises at least one hole (5) configured to allocate the two ends (10) of the at least one tensioning element (8), wherein each one of the at least one hole (5) of the two anchoring elements (9) are coaxial in at least some extension, being a longitudinal axis of each one of the at least one hole (15) comprised within the same transversal plane that an axis of the at least one pitch bearing (1). In such an embodiment, the two anchoring elements (9) are located with respect to each other in such a way that the holes (15) for allocating both ends (10) of a tensioning element (8) are coaxial in at least some extension (each hole (15) being comprised in one of the two different anchoring elements (9)), being the longitudinal axis of both holes (15) comprised within the same transversal plane to the at least one pitch bearing (1) axis.

Said anchoring elements (9), in an embodiment with multiple tensioning elements (8) may additionally allow the passage of the tensioning elements (8) that are not joined to them so that their axes are kept in a plane transversal to the axis of the at least one pitch bearing (1) while keeping the distance between tensioning elements (8). This avoids the tensioning system (7) exerting a force outside a transversal plane to the axis of the at least one pitch bearing (1).

In the exemplary embodiment shown in FIG. 5, the tensioning system (7) comprises four tensioning elements (8) (which are strands in this case) and two anchoring elements (9), each anchoring element (9) being configured to cooperate with four fixing elements (11) to fix the four ends (10) of two strands once tensioned. The length of each of those two strands allows covering almost the full perimeter of the outer ring (5) of the at least one pitch bearing (1).

In an embodiment, the force applied to each of the strands is substantially the same. In the previous embodiment, the force applied to each of the strands is 150 kN for a particular solution applied to a multimegawatt turbine.

In an alternative embodiment shown in FIG. 6, the tensioning system (7) comprises eight tensioning elements (8) (which are strands in this case) and two anchoring elements (9), each anchoring element (9) being configured to cooperate with eight fixing elements (11) to fix one end (10) of each of the strands of the embodiment. The length of each of those strands does not cover the full perimeter of the outer ring (5) of the at least one pitch bearing (1). Instead, it covers at least the perimeter between the two anchoring elements (9).

In a particular embodiment, the tension force (F) applied to the strands covering a sector closer to the main shaft (13) is lower than the tension force (F) applied to the strands covering the rest of the at least one pitch bearing (1).

With such an aim, the at least one anchorage element (9) is located in a region within 30-90° far from the main shaft (13) of the wind turbine, so as to greater reinforce a region of the at least one pitch bearing (1) proximate to the sectors 70-110° and 250-290°. In the sector proximate to the main shaft (13) the tension force (F) can be lower than in the sector opposite therein.

For example, in said embodiment of FIG. 6, different tension can be applied to tensioning elements (8) (strands) a-d and another one applied to tensioning elements (8) (strands) e-f. In such an embodiment, the anchoring elements (9) are preferably attached to the hub (3) or the at least one pitch bearing (1) such that the tension force (F) applied to the strands can be varied between sectors accordingly.

In an embodiment, the tensioning system (7) covers approximately the whole perimeter of the at least one pitch bearing (1). In an alternative embodiment, at least a part of the strands extends along a partial angular span of the at least one pitch bearing (1). In a further embodiment, this span covers at least 180°.

Preferably, different tension can be applied to at least two tensioning elements (8) joined to different anchoring elements (9). Therefore, that at least two tensioning elements (8) fixed each to a different anchoring element (9) are independently tensionable.

Also preferably, the tension applied to tensioning elements (8) covering the sector closer to the main shaft (13) is lower than the tension applied to tensioning elements (8) covering the rest of the at least one pitch bearing (1). Therefore at least one tensioning element (8) covering a first sector closer to the main shaft (13) than a second sector far from the main shaft (13) than the first sector, and at least one tensioning element (8) covering the second sector, wherein the at least one tensioning element (8) covering the first sector is tensionable at a lower tension than the at least one tensioning element (8) covering the second sector.

In an embodiment, those tensioning elements (8) are located over the outer surface (14) of the at least one pitch bearing (1). This can be seen in FIGS. 5 and 6. In both figures the inner ring (4) of the at least one pitch bearing (1) has not been represented.

Alternatively, some guiding elements (16) including at least one hole for the passage of the at least one tensioning element (8) and are attached to the outer ring (5) of the at least one pitch bearing (1) such as to guide the tensioning element (8) throughout them. The guiding elements (16) may be attached to the at least one pitch bearing (1) via a plurality of bolts, in an embodiment being those bolts some of the bolts used for the connection of the at least one blade (2) to the hub (3) of the wind turbine. In this embodiment the tensioning elements (8) are not placed on the outer surface (14) of the at least one pitch bearing (1).

In an alternative embodiment, the guiding elements (16) attached to the outer ring (5) of the at least one pitch bearing (1) can be removed from the outer ring (5) of the at least one pitch bearing (1) once the at least one tensioning element (8) has been placed in its position or remain in said position working as a safety element.

In an embodiment, both ends (10) of a tensioning element (8) are fixed to the same anchoring element (9), whereas in an alternative embodiment both ends (10) are fixed each to a different anchoring element (9).

The use of several tensioning elements (8) allows to gradually increase the stiffness of the at least one pitch bearing (1). Thus, depending on the loads that a wind turbine and more particularly the at least one pitch bearing (1) is going to stand in a particular location (depending on the wind and operating conditions), the number of tensioning elements (8) can be adjusted. In FIG. 7 there are represented embodiments of the tensioning system (7) with two and four strands disposed in parallel.

In FIG. 7 some tensioning elements (8) of the tensioning system (7) that are a plurality of strands placed together are represented. Preferably, as shown in FIG. 8, the tensioning system (7) comprises a plurality of tensioning elements (8), i.e. strands, located side by side, in such a way that each of them exerts a part of the radial compression force (RC).

In an embodiment, several layers of tensioning elements (8) can be placed one on top of the other so as to further increase the radial compression force (RC) transmitted to the at least one pitch bearing (1). Including more than one layer, for example, two layers as in FIG. 8, allows applying a higher radial compression force (RC) to the at least one pitch bearing (1) but still keeping this force applied over the required area of the at least one pitch bearing (1) (due to space limitation constraints, i.e. the dimensions of the bearing ring and the required diameter of the strands for a given tension, several layers may be needed to apply a certain radial compression force (RC) over the rolling race (6) closer to the at least one blade (2) for example in the case of the outer ring (5) being connected to the hub (3)).

In an embodiment, the tensioning elements (8) are stacked in at least two layers. Generally, the strands have a tensioning limit that cannot be exceeded and, depending on the required tensioning level, by placing the strands next to each other, there is the possibility that i) either the tensioning level is not achieved as an insufficient number of strands is used or ii) that a compression force is exerted in a zone of the at least one pitch bearing (1) in which it is not convenient to have it as the strands cover also this zone. Therefore, with an embodiment comprising strands stacked in at least two levels, allows concentrating the compression force in the more convenient zone, for example, proximate to a particular rolling race (6) depending on the connection of the outer ring (5) being to a blade (2) or to the hub (3).

FIG. 8 shows a tensioning system wherein the tensioning elements (8) comprise strands, and wherein the strands are stacked in two layers, a layer located more proximate to the outer ring (5) of the at least one pitch bearing (1) comprising four strands and a layer stacked over it comprising three strands. In this figure, the outer ring (5) of the at least one pitch bearing (1) is connected to the hub (3) and the at least one pitch bearing (1) comprises two rolling races (6). Therefore, the two layers of stacked strands are located proximate to the rolling race (6) more proximate to the hub (3) to reduce the deformations in such an area.

Also, in this solution, an element is placed between at least two layers of strands, being configured such as to avoid the transmission of the loads that are not compression forces to the strands located in the layer closer to the outer ring (5) of the at least one pitch bearing (1) from the strands stacked over it. Thus, the strands located in the layer closer to the outer ring (5) of the at least one pitch bearing (1) do not tend to separate due undesired forces exerted by the strands of the layer stacked over it.

If the longitudinal axis of the tensioning elements (8) (being for example strands) is not contained within the same transversal plane to the axis of the at least one pitch bearing (1) along all its length, a small lever arm is generated. This lever arm, joined to the tensioning force (F), creates an undesirable torque (M) on the at least one pitch bearing (1) as seen in FIG. 9.

Therefore, in a preferred embodiment, the anchoring element (9) comprises at least two holes (15) (as shown in FIGS. 10 to 12) whose axes are coplanar, and which are separated by a certain distance in order to allow allocating both sides of a strand and perform the required tensioning works.

In turn, the anchoring element (9) and the tensioning element (8) are positioned such that the axis of the tensioning element (8) is coplanar with the axis of the at least two holes (15) in such a way that the lever arm is avoided. That is an important feature for the correct functioning of the tensioning system (7). Furthermore, the plane is perpendicular to the at least one pitch bearing (1) axis.

In FIGS. 11 and 12 two kind of anchoring elements (9) are shown. In FIG. 11 an anchoring element (9) for anchoring the ends (8) of two strands that pass through the holes (15) is shown. In FIG. 12 an anchoring element (9) that furthermore comprises a groove (12) for the passage of the strands that are not anchored to said anchoring element (9) is shown.

Notwithstanding the kind of anchoring used, in an embodiment the outer ring (5) comprises a recess on the outer surface to allocate the tensioning element (8) in order to avoid its movement along the axial direction of the at least one pitch bearing (1).

The main advantage of this wind turbine regarding those proposed on the state-of-the-art is that the at least one pitch bearing (1) is reinforced without size increasing.

Additionally, the stiffness of the at least one pitch bearing (1) can be enhanced either homogeneously along its perimeter or differently in different sectors according to their needs by a proper selection of the number and location of the anchoring elements (9) and the tensioning force (F) applied to the tensioning elements (8) connecting the anchoring elements (9).

Also, a single design for the hub (3) and at least one pitch bearing (1) can be used in different locations (thus subjected to different load conditions) and with different wind turbine models (comprising greater rotors and higher towers), by configuring the reinforcement of the bearing as required by the load conditions (for example, by a proper selection of the number and location of the anchoring elements (9), the number of tensioning elements (8) and the tension applied to each of them, etc.).

The invention claimed is:

1. A wind turbine comprising:
a hub;
at least one blade; and
at least one pitch bearing to connect the at least one blade to the hub, the at least one pitch bearing comprising at least an inner ring and an outer ring, and at least a rolling race;
wherein the wind turbine further comprises at least one tensioning system configured to exert a radial compression force to at least a part of the outer ring of the at least one pitch bearing;
wherein the at least one tensioning system comprises:
at least one tensioning element with two ends;
at least one anchoring element configured to receive at least one of the two ends of the at least one tensioning element; and
at least one fixing element configured to fix the at least one of the two ends of the at least one tensioning element to the at least one anchoring element;
wherein the at least one tensioning element comprises at least one strand;
wherein the force applied to the at least one strand is at least 100 kN;
wherein the at least one tensioning system further comprises at least two strands with at least a respective one of the at least one anchoring element per each of the at least two strands, all of the respective anchoring elements disposed in different regions of a perimeter of the outer ring in a circumferential direction of the at least one pitch bearing.

2. The wind turbine of claim 1 wherein the force applied to the at least one strand is at least 150 kN.

3. The wind turbine of claim 1 wherein the at least two strands are disposed side by side.

4. The wind turbine of claim 1 wherein the force applied to each one of the at least two strands is the same.

5. The wind turbine of claim 1 wherein the force applied to each one of the at least two strands is different.

6. The wind turbine of claim 1 wherein the at least two strands are disposed in several layers, one of top of the other.

7. The wind turbine of claim 6 comprising four strands of the at least two strands disposed in a first layer of the several layers disposed adjacent to an outer surface of the outer ring of the at least one pitch bearing and three strands of the at least two strands disposed in a second layer of the several layers disposed on top of the first layer.

8. The wind turbine of claim 1, wherein the at least one rolling race of the at least one pitch bearing further comprises two rolling races.

9. The wind turbine of claim 1, wherein all of the respective anchoring elements are placed at perimetral positions with regards to the outer ring of the at least one pitch bearing at 90° or a lower angle with the projection of the main shaft of the wind turbine in a plane perpendicular to an axis of the at least one pitch bearing.

\* \* \* \* \*